Jan. 5, 1971     R. F. BORKENSTEIN     3,552,930

BREATH SAMPLING AND ANALYZING APPARATUS

Filed March 6, 1968     5 Sheets-Sheet 1

INVENTOR
ROBERT F. BORKENSTEIN
BY Woodard, Weikart
Emhardt & Naughton
ATTORNEYS

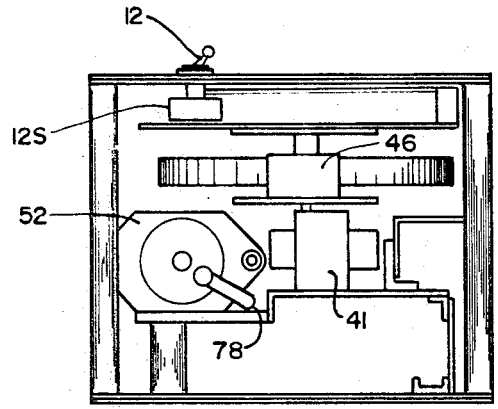
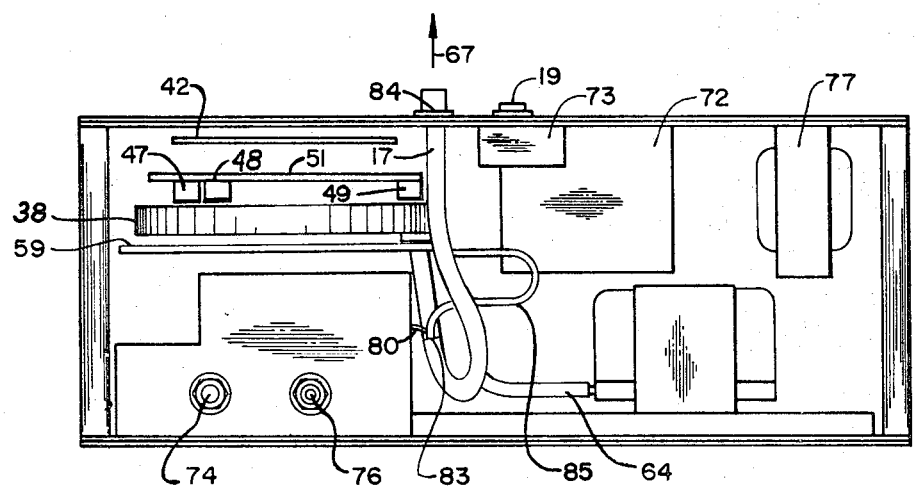

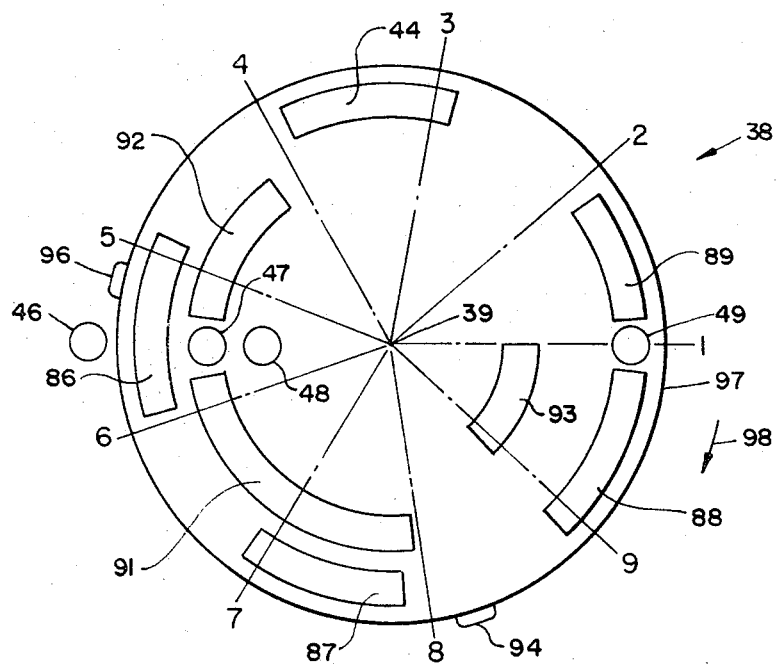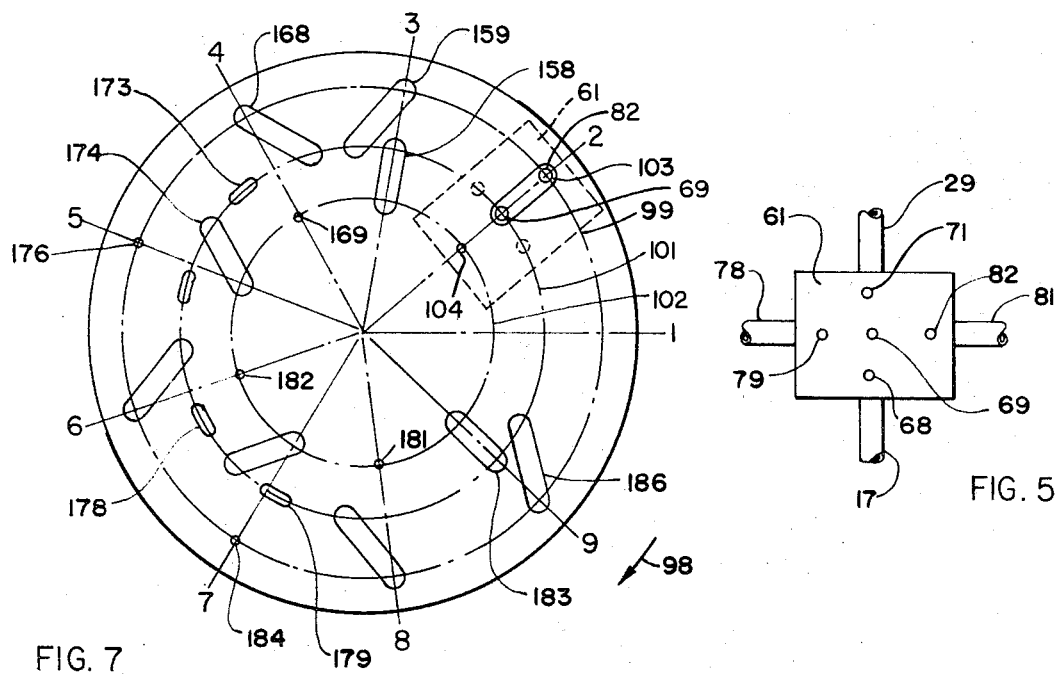

United States Patent Office 3,552,930
Patented Jan. 5, 1971

3,552,930
BREATH SAMPLING AND ANALYZING APPARATUS
Robert F. Borkenstein, 831 S. High St., Bloomington, Ind. 47401
Filed Mar. 6, 1968, Ser. No. 711,005
Int. Cl. G01n 1/22, 21/02, 33/16
U.S. Cl. 23—254                                14 Claims

ABSTRACT OF THE DISCLOSURE

A motor-driven, multistation, program directing valve wheel or disc having passageways therein for cooperating with a sample taking tube, a sample receiving and measuring cylinder, and a delivery tube, in a suitable sequence. A plurality of cams on the disc and a plurality of strategically placed cam-operated switches associated therewith and with a shuttle piston coordinating switch in the sample receiver and measuring cylinder for establishing and maintaining a sequence of operating steps. Alarm means, a purge pump, and a color-coded stage indicator, all associated with the program disc and switches. A photometer with a sampling ampoule associated with the delivery tube, and a standard ampoule for reference, and associated nullmeter and balancing means, with a direct reading percent-alcohol register.

BACKGROUND OF THE INVENTION

Field of the invention

This invention relates generally to gas sampling and analyzing apparatus, and more particularly to apparatus conveniently useful for determining the alcoholic content of the breath of human beings.

Description of the prior art

Various prior art devices and methods are known for analyzing breath samples. Some employ photometers and some do not. Perhaps the most pertinent prior art apparatus capable of both sampling and analyzing the breath is that disclosed in my U.S. Pat. No. 2,824,789, issued Feb. 25, 1958 and entitled "Apparatus For Analyzing A Gas." The present invention is a further development of that apparatus, intended to implement a more automatic type of operation, so easily accomplished as to enable the attainment of accurate, consistent and reliable results, even by novices.

SUMMARY

Described briefly, in a typical embodiment of the present invention, a manually operable start switch is provided to initiate a semiautomatic progression through a predetermined sequence of events under the control of program director means. Sample obtaining, measuring, and delivery means are associated with the program director means, the latter establishing the time, nature and duration of communication between the obtaining and measuring means and between the measuring and delivery means. These features of the invention and various other features may be combined according to the invention to enhance the error-free, foolproof operation obtainable.

One such feature is a master relay to prevent operation of the apparatus until various sample receiving and delivery components have reached a satisfactory desired operating temperature. A pump is provided for implementing one of the purge operations and for sample delivery, without the pump directly handling the sample itself. Alarm means are provided and operated by the program director at certain stages in the sequence, to alert the operator to the fact that the apparatus is ready for taking a sample or for analysis of a sample. A coordinating control is provided including switch means associated with the sample measuring means to avoid advance of the program until certain conditions have been met, including completion of any measuring step required at that particular stage in the program.

BRIEF DESCRIPTION OF THE DRAWING

FIG. 3 is a left-hand elevational view.

FIG. 4 is a front elevational view.

FIG. 5 is a top plan view of the valve port plate, much enlarged.

FIG. 6 is a top plan view of the program wheel on an enlarged scale, and showing the cam arrangement thereon.

FIG. 7 is a section through the program wheel taken on a horizontal plane located slightly above the bottom surface thereof and illustrating the flow directing grooves therein, which at the lower face of the wheel cooperate with the ports of the port plate, the faces of these parts being lapped together for a fluid tight slidable seal action.

DESCRIPTION OF THE PREFERRED EMBODIMENT

Figure 1:
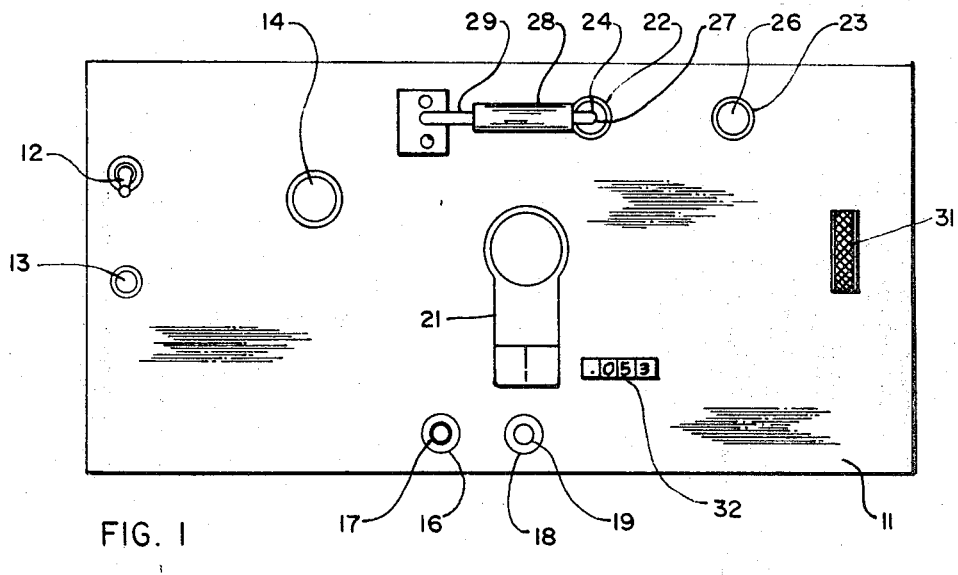
FIG. 1 is a top plan view of a typical embodiment of the present invention with the cover lid removed.

Referring now to the drawings in detail, and particularly FIG. 1, the top panel of the apparatus is shown with the cover removed and includes an on-off switch toggle lever 12 and a red lamp jewel 13 associated therewith to indicate when the power to the unit is turned on. A start switch push button is provided at 14 and has a glass in the center thereof through which can be seen light of various colors to indicate the stage of operation of the device, as will become apparent hereinafter. Suffice it to say at this point that item 14 is a start switch push button with a light transmitting lens therein.

A fitting 16 in the top panel 11 provides a slide fit for a flexible plastic sample-receiving tube 17 which can be pulled up through the fitting to enable the individual who is the subject of the test to blow into the tube. A fitting 18 is provided adjacent fitting 16, and a push button 19 is provided therein to operate a null switch. A null meter is provided with the indicator thereof at 21 adjacent the null switch button.

Two wells 22 and 23 are provided in the top panel. These receive transparent glass ampoules 24 and 26, respectively, each containing, for example, a solution of three milliliters of .025% potassium dicromate in 50% by volume of concentrated sulphuric acid. Ampoule 26 is sealed and is used as a standard. Ampoule 24 is identical, except that the top is open and receives a bubbler pipe 27 connected by a suitable resilient fitting 28 to a delivery pipe 29 affixed to the top panel.

The wells 22 and 23 receiving the ampoules 24 and 26 are portions of a photometer of a type more fully described hereinafter and also in my aforementioned patent. The balancing thereof is accomplished by use of a knurled wheel 31 exposed in an opening in the top panel 11. A register 32 for a counter associated with the balance wheel is provided in a panel opening adjacent the nullmeter, and a legend "Percent Blood Alcohol" is provided adjacent the register.

Figure 2:
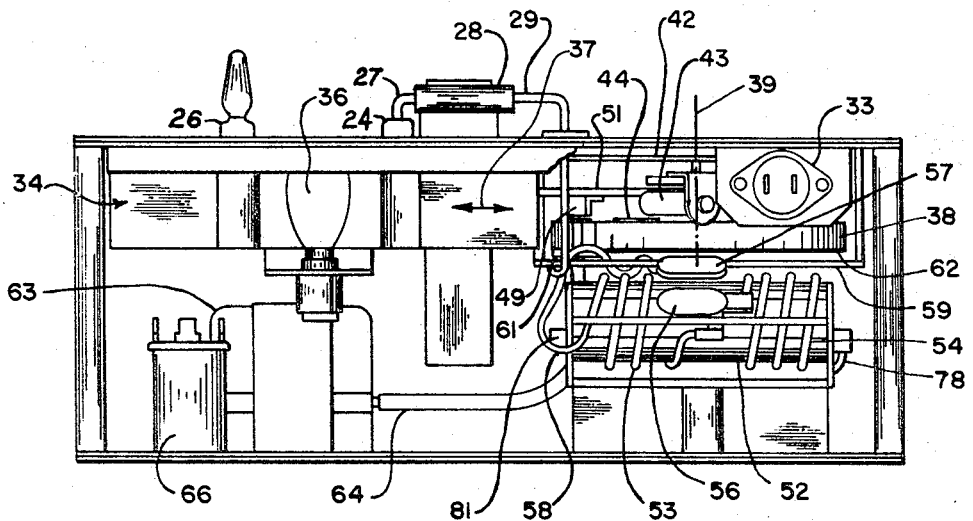
FIG. 2 is a rear elevational view thereof with the rear cover plate removed, as is the case for FIGS. 3 and 4.

Referring now to FIG. 2, a plug 33 is provided in a recess for reception of an extension cord for connecting to a 110 volt 60 cycle outlet. This is for convenience, and other power supplies could be provided, if desired.

The photometer, designated generally at 34 is provided with the lamp 36 mounted on a carriage movable back and forth in the direction of arrows 37 by rotating the balance knob 31 on its horizontal axis. A screw on the knob shaft and thread on the carriage can be used conveniently for this function, and such details are not shown because they are conventional and not a part of this invention.

A program wheel or disc 38 is mounted in the frame for rotation on a vertical axis 39 when driven by a motor 41 (FIG. 3) through a reduction gear set under the disc. A stage indicator color frame disc 42 is spaced above the program disc and rotates in unison therewith on the same shaft. A stage indicator lamp 43 is mounted between the discs, and serves as one form of annunciator, as will be described hereinafter.

A cam 44, which is one of a plurality of cams mounted to the top of the disc 38 can be seen in FIG. 2. This cam and the other cams, as well as several cams mounted on the periphery of the disc serve to operate various switches located adjacent the disc (FIGS. 2, 3, 4, 6 and 10). These include an alarm initiator switch 46, a pump start switch 47, a counter reset switch 48, and a motor control circuit switch 49. Switches 47, 48, and 49 are secured to the underide of a stationary mounting plate assembly 51 disposed between the program disc and the station indicator disc 42.

A sample receiving and measuring cylinder 52 is secured in the frame and has coils 53 and 54 of electric heating wire around it, with the thermostatically controlled switch 56 mounted to the cylinder for thermal conductivity but electrically insulated therefrom and electrically in series with the two coils. A second thermostatically operated switch 57 is also mounted to the cylinder 52 for thermal conductivity but is electrically insulated therefrom. Both of these switches are normally closed until the cylinder reaches the desired operating temperature (45° Celsius).

The heater wire portion 58 from coil 53 extends up and into contact with the exterior of the delivery pipe portion 29 which projects below the top panel, in order to heat the delivery pipe just as the sample receiver cylinder is heated. The continuation of this wire extends downward from the delivery pipe and is wrapped around a stationary plate 59 affixed to the frame and which serves as a mount for various components including plate 51 (through a group of upstanding posts) switch 46, and a distributor port plate 61 having an upper face in flush sealing engagement with the lower face 62 of the program disc.

An air pump 63 is mounted to the frame and supplies air through the line 64 to the port plate 61 at certain times as will be later explained. A conventional flasher switch 66 is also secured in the frame to serve as an alarm in a manner which will be described.

Referring to FIG. 4, it will be noted that the breath sample receiving tube 17 is provided with a fairly large loop therein. This enables it to be pulled upward out of the interior in the direction of arrow 67 to make it easier for the subject of the test to place the mouthpiece thereof in his mouth and blow into the tube. This tube 17 is also connected to the port plate 61, communicating with port 68 therein, whereas the pump tube 64 communicates with the center port 69 in the port plate. The delivery pipe 29 communicates with port 71 in plate 61.

The counter 72 is also shown at FIG. 4, the register 32 thereof being displayed through the opening in the top panel as previously described. The null switch 73 is provided under the panel and operable by the null button 19 of FIG. 1. A thermal relay disabling switch button 74 is provided at the lower front of the apparatus and a manual advance switch toggle lever 76 is provided adjacent thereto. A transformer is secured to the frame at 77.

Referring further to FIGS. 2, 3 and 5, a tube 78 is provided from port 79 of the port plate to the one end of the sample receiver cylinder which we will refer to as the left-hand end because it is on that end when the apparatus is viewed from the front, FIG. 2 being a rear view. Similarly a tube 81 is connected from the right-hand end of the sample receiving cylinder to port 82 of the port plate.

Figure 10:
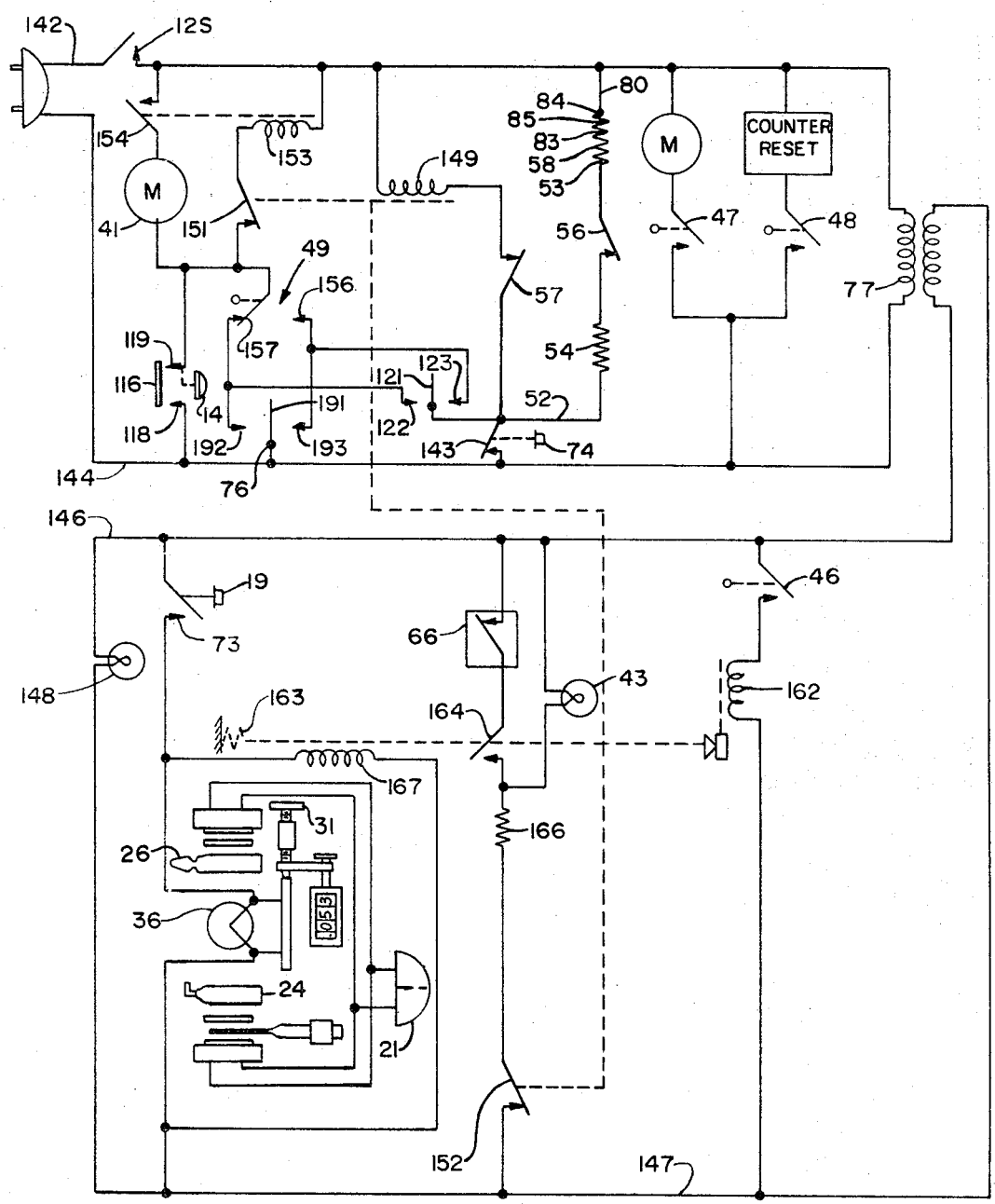
FIG. 10 is an electrical schematic diagram of the apparatus.

Referring again to FIG. 4, a portion 85 of heater wire extends from the windings on the plate 59 and is received in the breath receiver tube 17 at 83 and extends upwardly in the tube to a point 84 near the inlet end of the tube. At point 84 the heater wire is connected to a conductor 80 which is returned to the exterior of the tube at location 83 and completes the heater circuit (FIG. 10). In this way, the incoming air will not be chilled as it passes through the receiver tube even if the tube is pulled out of the housing a considerable distance for the convenience of the subject being tested.

Referring now to FIG. 6, which is a top plan view of the program wheel 38, there are nine radial reference lines thereon radiating from the central axis 39 and at forty degree intervals. For reference purposes, each of these will designate a "station" for the wheel and each is provided with a reference numeral associated with its respective radial line. The cams on the top surface are generally arcuate in shape when viewed from the top, and as shown in FIG. 2 with reference to cam 44 in particular, they are merely slight vertical projections from the top surface. An outer circular "row" of these cams includes the cams 44, 86, 87, 88, and 89, all disposed at the same radius from the axis. An intermediate row includes cams 91 and 92 disposed at a certain radius, and a cam 93 is provided at a still lesser radius. Cams 94 and 96 are provided on the periphery 97 of the wheel. The switches operated by the various cams have been referred to previously herein and are represented schematically in FIG. 6 by circles, representing the cam follower members typically employed with these switches for operation thereof by the cams. The circles are located in FIG. 6 at the same location as the switch operating followers are mounted in the apparatus. The location of the cams with reference to the radial station designating lines is significant in most instances for reasons which will become apparent as the description proceeds. When viewed from above, as in FIG. 6, the operation of the program wheel by the motor is always in the direction of the arrow 98.

Referring now to FIG. 7, which is a section through the program wheel taken on a horizontal plane immediately above the lower face thereof, we see a typical arrangement of passageway grooves provided in the lower face of the wheel for directing fluid flow as required upon registry of each of the various stations with the distributor port plate 61 of FIG. 5. Here too the radial reference lines are provided.

At station 1, there are no passageways or ports, in contrast to the various other stations. It is station 1 which is in registry with the port plate 61 when a test has been completed and before the next test has been initiated. It will be helpful in the understanding of the invention to keep in mind that various passageways and ports are provided in the disc with specific relationships not only to the radial reference lines, but also to three circles 99, 101, and 102. Circles 99 is always vertically aligned with the port 82 in plate 61. Circle 101 is always vertically aligned with ports 68, 69, and 71 of plate 61, and circle 102 is always vertically aligned with port 79 of plate 61. Ports 79, 69 and 82 are always aligned with whichever one of the radial reference lines happens to be disposed above the port plate 61. This depends upon the stage of operation of the apparatus in its sequence.

Referring again to FIG. 7, at station 2 there is a face groove passageway 103 and a port 104, the latter extending up through the disc and opening at the upper face thereof. Similar provisions are provided at the other stations, their arrangement depending upon the objective to be attained at each station.

Figure 8:
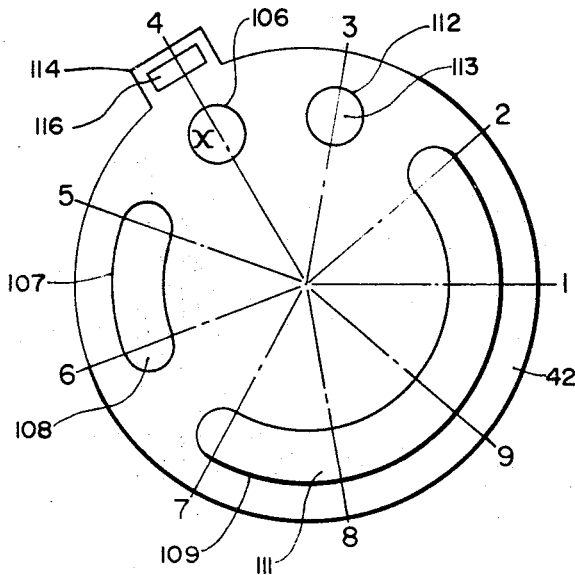
FIG. 8 is a top plan view of the phase indicator disc.

Referring now to FIG. 8, showing the station indicator disc, its orientation on the drawing sheet conforms to that of the program disc in FIGS. 6 and 7, for ease of reference. The station indicator bulb 43 is located at the position X with reference to FIG. 8 and below the indicator disc 42. The disc is opaque and has openings therethrough of various configurations with transparent plastic film covering each of the openings. For example, at station 4 of the disc 42, the aperture 106 is circular and has a yellow transparent plastic film thereacross. This is below the translucent lens in the start switch button 14 referred to with reference to FIG. 1 so that when the light 43 below this disc is illuminated, the yellow light will be apparent in the start switch button. This occurs when station 1 of this disc and station 1 of the program disc are over and in registry with the port plate 61 at the end of one operating sequence and ready for the next operating sequence.

A kidney-shaped slot-type aperture 107 is provided at stations 5 and 6 of the indicator disc 42 for registry thereof with the lamp 43 when either station 2 or station 3 of the program disc is in registry with the port plate 61. This slot has a blue colored transparent film therein to indicate that the purging step is taking place, which occurs at both stations 2 and 3 of the program disc.

A curved aperture 109 extends through five positions of the indicator disc and has a red colored transparent film 111 therein to indicate that at stations 4 through 8 the subject being tested should blow continuously into the sample receiving tube.

An aperture 112 is provided at the next position on the indicator disc and has a green film therein to indicate that at station 9 of the program wheel the sample is being moved through the solution in the test ampoule.

The indicator disc also has an outwardly projecting tab 114 thereon which has an electrically conductive bridging contactor strip 116 on the upper face thereof. At the one position of the program wheel and indicator wheel wherein station 1 of the program wheel is in registry with the port plate 61, this bridging contactor strip 116 is in registry with the movable contactors 118 and 119 (FIG. 10) of the start switch which can be moved simultaneously into engagement by pushing the switch button 14 (FIGS. 1 and 10). At all other positions of the program wheel, the start switch is ineffective.

Figure 9:
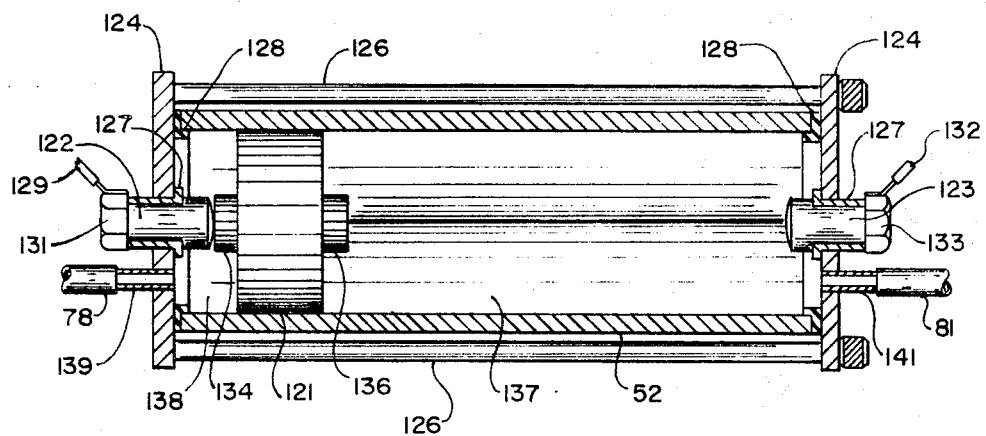
FIG. 9 is a longitudinal section through the sample receiving and measuring cylinder.

Referring now to the sample cylinder drawing of FIG. 9, the cylinder 52 has a piston 121 fittingly received therein used as a movable partition and serving as a divider, dividing the cylinder into two chambers, and slidable along the length thereof between two stops 122 and 123 which are actually permanent magnets. These magnets are mounted in end plates 124 which close the ends of the cylinder 52 and are retained in place by the tie rods 126. The magnets are insulated from the end plates by grommets 127 and the end plates are insulated from but sealed to the cylinder by the rubber rings 128. A possible variation would be to place a magnet in the piston and use simple soft iron bars in the end plates.

An electrical conductor 129 is connected to a nut 131 secured to magnet 122, and a wire 132 is connected to a nut 133 secured to magnet 123. The piston 121 can be made of ferro-magnetic material having projections 134 and 136 opposite faces thereof and integral therewith for assurance that the piston motion from one end of the cylinder to the other is not stopped until there is contact between he piston and one or the other of the magnets. The cylinder 52 may be made of an elecrically conductive material such a stainless steel, brass, or bronze, for example, and the overall clearance between the outside diameter of the piston and the inside diameter of the cylinder is of the order of three ten-thousandths of an inch thus providing good contact between the piston and the cylinder and providing a reliable seal between the chamber 137 on the right-hand side of the piston and 138 on the left-hand side of the piston. Consequently, when the piston is at the left-hand end of the cylinder, a complete electrically conductive path is made from the wire 129 through the magnet and piston to the cylinder 52 for a purpose which will become apparent as the description proceeds.

Each of the end plates has an air inlet-outlet port and fitting thereon. For the left-hand end plate, it is fitting 139 which receives the tube 78 referred to above, and the right-hand end plate has fitting 141 receiving tube 81 referred to above.

OPERATION

The first step in the operation of the illustrated embodiment is connection thereof to a 110 volt, 60-cycle electrical supply. The on-off toggle switch lever is moved to the on position closing switch 12s (FIG. 10). This makes a circuit from conductor 142 through the electrical heater portion 53 and 54 in series with the normally-closed thermostatically-operated switch 56 and switch 143 to conductor 144 to initiate heating of the various components through which the breath sample will be moved during the operation. Closure of the on switch 12s also energizes the primary winding of the step-down transformer 77 to provide a 6.3 volt potential across lines 146 and 147 of the secondary winding. This energizes the on-off bulb 148 under the top panel jewel 13 to indicate that the apparatus is turned on.

Closure of switch 12s also makes a circuit through a master relay coil 149, the normally-closed thermostatically-operated switch 57, and the switch 143. This energizes relay winding 149 which immediately opens the master relay contacts 151 and 152, the former preventing energization of the program wheel drive motor 41, and the latter preventing energization of the station indicator lamp 43 and flasher alarm switch 66. If there is some essential need at this time for some reason to activate bulb 43 or motor 41, the effect of the master relay can be overcome by pushing the button 74 to open switch 143. However, this switch 143 will return to its normally-closed condition as soon as manual pressure is released from the button 74.

When the desired operating temperature has been reached, the thermostat control on switch 57 will respond to the sample receiver cylinder temperature and open the master relay coil circuit, deenergizing the winding 149 thereof whereupon the contacts 151 and 152 will close. Light 43 is thereby energized and the color of light observed through the push-to-start button 14 will indicate to the operator, whether or not the apparatus is at the proper station to begin a test. It should be at station 1 which is indicated by the yellow light and if it is not at that station, it can be advanced to that station by manually working the switch toggle 76.

When station 1 is in registry with the port plate 61, the sample ampoule is placed in the well 22 and the bubbler tube 27 is inserted therein so that a gas sample moved through the bubbler tube 27 from delivery tube 29 will bubble up through the solution in the ampoule. The standard ampoule is already in place in the well 23.

The start switch button 14 is then pushed making a circuit through contactors 118 and 119 and bridging contactor 116, and through master relay contacts 151 and the motor relay coil 153. Energization of the motor relay coil 153 closes the motor relay switch 154 to energize the motor 41 and initiate rotation of the program wheel. As soon as the disc has been driven a few degrees, while the start button is depressed, cam 89 (FIG. 6) closes the normally-open contact 156 of the motor control circuit switch 49. The sample cylinder piston 121 is normally retained in contact with the right-hand end magnet 123 by the magnetic force. Consequently the motor relay coil remains energized by the circuit through switch 151, contact 156 of switch 49, the contact magnet 123 and piston 121, the sample cylinder housing 52, and switch 143. Adjacent station 2, the cam 89 terminates and the switch 49 thereupon returns to its normal state wherein the movable contactor is normally closed with contact 157 thereof. The opening of contact 156 breaks the motor holding circuit whereupon the motor relay coil 153 is deenergized and the motor stops.

At station 2, distributor or program disc passageway 103 is in registry with the port plate apertures 69 and 82 for the pump and right-hand end of the receiver cylinder, (port plate shown dotted in FIG. 7) thus providing communication between the pump and the right end of the cylinder ( FIGS. 5 and 7). At station 2, the cam 91 (FIG. 6) closes switch 47 to start the pump motor. The pump, moving air from the atmosphere through tube 64, port 69, passageway 103, and tube 81 to the right-hand end of the cylinder, moves the piston to the left. Upon reaching the left-hand end contact magnet 122, the piston closes the motor relay circuit through the normally-closed contact 157 of switch 49 so the motor drives the disc to registry of station 3 with the port plate 61. At station 3, the cam 44 opens the normally-closed contacts of switch 49 to break the motor relay circuit so the motor stops and the program wheel is stopped at station 3.

When station 3 is in registry with the port plate 61, the disc passageway 158 is in registry with the pump port 69 and port 79 providing communication between the pump and the left-hand end of the receiver cylinder. The disc groove or passageway 159 provides communication between port 82 and the delivery port 171 to which the delivery tube 29 is connected. As the pump moves the piston toward the right end of the cylinder, air is moved out of the left end thereof through port 79, disc passageway 158, port 69, and the delivery tube 29 and is bubbled up through the sample ampoule. This provides a purging action to clear the apparatus of any trace of the preceding test.

When the piston 121 reaches the right end contact magnet 123, the piston closes the motor relay circuit through the cam-closed normally-open contacts of switch 49, so the motor drives the disc to station 4, the cam 44 maintaining the circuit closed to switch 49 until registry of station 4 with the port plate 61 is accomplished. Adjacent station 4, the cam 44 terminates, opening the motor relay circuit to cause the disc to stop station 4 in registry with the port plate. After departure from station 3, termination of closure of the pump switch 47 is accomplished because the cam 91 terminates, so the pump stops. Immediately before arrival of station 4 at the port plate, the peripherally mounted cam 94 closes the alarm initiator switch 46. This energizes a relay coil 162 in the low-voltage circuit enabling a spring 163 to close the switch contacts 164 of a flasher control relay. A circuit is thereby made through the normally-closed contacts of the flasher switch 66, and resistor 166 and the master relay contacts 152. The flasher switch 66 being of typical conventional construction, is heated upon passage of current therethrough resulting in the opening of the contacts thereof with an audible clicking sound. The resultant cooling permits closure with a clicking sound. Consequently, arrival of the disc at a condition of registry of station 4 with the port plate is associated with an audible clicking of the flasher switch. The stage indicator lamp 43 under the start button and electrically in parallel with flasher switch, also begins flashing and the red colored film 111 (FIG. 8) of the station indicator disc provides a red flashing light at the start switch button. The combination flashing and clicking alerts the operator that it is now time to balance the photometer and take a sample.

At the station 4 condition, the operator pushes the null button 19, closing the null switch 73. This turns on the photometer bulb 36 causing a displacement of the null meter needle if any balancing is needed. It also energizes the reset relay coil 167 to open the switch 164 and terminate flasher operation. While the null button is held down, the balancing knob is moved in the direction appropriate to return the null meter needle to the null condititon, thus balancing the photometer circuit. Then the null button is released whereupon switch 73 automatically opens, turning off the photometer light 36.

The subject being tested, places the upper end of the sampling tube 17 tightly between his lips (a disposable mouthpiece can be used if desired), and he blows into the sampling tube. Program wheel passageway 168 communicates the sampling tube port 68 with the right cylinder port 82, and the piston is moved to the left by the subject blowing into the sampling tube. The left-hand end is vented to atmosphere through port 79 and the disc aperture 169 in registry therewith just as the left-hand end is vented to atmosphere through port 104 when the pump is filling the right end of the cylinder at station 2. When the piston reaches the left end, it closes the motor relay circuit, causing the motor to drive the disc to registry of station 5 with the port plate 61, whereupon the cam 86 opens the normally-closed contact 157 of switch 49 to stop the motor. Between stations 4 and 5, cam 93 closes the counter reset switch 48 and resets the counter to zero. Also between station 4 and 5, the disc aperture 173 provides a venting of short duration from the port 68 through the disc to atmosphere. This makes it a little easier on the subject who continues blowing during passage from station 4 to station 5.

When station 5 is in registry with the port plate, the disc passageway 174 is in registry with port 68 and port 79 to provide communication between the breath sample tube and the left-hand end of the cylinder. The right end is vented to atmosphere through port 176 in the disc. The subject continues blowing and the piston is moved toward the right. When the piston reaches the right end magnet contact 123, the motor starts and drives the disc to registry of station 6 with the port plate. As the disc moves between stations 5 and 6, the disc port 176 aids the subject as did the port 173 between stations 4 and 5.

With station 6 in registry with the port plate, the blowing continues and piston action likewise, as at station 4. When the piston reaches the left end magnet contact 122, the motor is started and drives the disc to registry of station 7 with the port plate. Cam 87 breaks the motor relay circuit when station 7 reaches the registry condition, so the motor stops.

During passage between stations 6 and 7, the disc port 178 provides venting to atmosphere. When registry of station 7 with the port plate is achieved, the blowing continues and piston action also, as at station 5. When the piston reaches the opposite end, it again starts the motor and the disc is driven to registry of station 8 with the port plate. The vent port 179 serves the same function between stations 7 and 8 as the corresponding ports between the preceding stations.

Upon attainment of registry of station 8 with the port plate, the blowing continues and the sample is collected in the right-hand end of the cylinder. The left-hand end is vented through port 181 just as it was vented through port 182 at station 6 and 169 at station 4. Because the subject has been blowing continuously during operation from station 4 through station 8, the sample collected at station 8 is deep-lung (alveolar) breath, as desired for accurate blood alcohol test results. When the piston makes contact with the left end magnet 122, the motor starts and the disc is driven to registry of station 9 with the port plate.

Upon attainment of registry of station 9 with the port plate, cam 92 starts the air pump and the disc passageway or groove 183 provides communication between the pump and the left-hand end of the sample receiver cylinder. Instead of the right end being vented through a port such as port 184 at station 7, a passageway 186 at station 9 provides communication between the right end and the delivery port 69 so that as the pump drives the piston to the right-hand end, the piston drives the breath sample out through the delivery tube and the bubbler. As the alveolar breath sample passes through the bubbler to atmosphere, the oxidation of alcohol occurring in the sample solution changes the light transmission characteristics thereof, depending upon the amount of alcohol contained in the sample. This effect is described more fully in my aforementioned patent, and is now well known in the art.

When the piston reaches the right end magnet contact 123, the motor is started thereby, driving the disc to registry of the starting station 1 with the port plate 61. As the disc moves between the station 9 and station 1 registry condition, the peripheral cam 96 closes the switch 46 to reactivate the flasher in the manner described above. The flasher remains activated until the null switch 73 is closed, as it did at station 4. This alerts the operator that the alcohol content of the sample can now be determined.

Upon being so alerted, the operator pushes the null button. This stops the flasher and turns on the photometer light. The null meter needle will be out of the null condition an extent depending upon the alcoholic content of the sample. As the operator holds the null button down with one hand, he rotates the balance knob with the other hand until the null meter registers a null condition. The amount of knob rotation required to obtain a null condition is registered as a number on the counter. The coupling between the photometer and the counter is calibrated so that the counter registers the blood alcohol content directly. This completes the test.

To prepare for testing a new subject, all that is needed is removal of the sampling ampoule and replacement with a fresh one. A new mouthpiece may also be used if desired.

It is believed that consideration of the foregoing description will make it apparent that the apparatus facilitates the accurate and reliable determination of the blood alcohol content of the person being tested. It has not been mentioned heretofore, but should be understood that it might be desirable to provide heating means in the photometer wells so that the sample and standard ampoules are at the same temperature. It may also be noted that while purging of a portion of the system is accomplished with the air pump at stations 2 and 3, purging of other portions is accomplished by the subject himself blowing into the sample receiving tube continuously during the transition from station 4 through 8. This feature thereby assures adequate purging of the sample receiver tube and cylinder as well as assuring that the collected sample is alveolar breath. A convenient displacement volume for the test sample is 100 milliliters, and the sampling solution volume and balance control of the photometer and register are calibrated accordingly. If samples of other volumes were desired, it could be done by making appropriate recalibration provisions in these components.

In view of the foregoing description, the function of the sample collection piston for motor actuation, can be appreciated. It can also be appreciated that because of the temperature controlled master relay and switch 151 associated therewith, it is normally impossible to cause motor operation so long as switch 151 is held open by the energized relay coil 149 prior to adequate warm up of the components. Nevertheless it might be desirable in certain instances to cause motor operation prior to adequate warm up. For this purpose, the push button 74 and switch 143 are provided to deenergize relay 149 and permit closure of the contact 151, so long as the button 74 is held depressed. This permits utilization of the toggle switch lever 76 of the emergency advance switch 191 to advance the motor. This is done by closing the movable contactor thereof with one or the other of the contactors 192 and 193 to energize the motor and advance the disc. One or the other of the contacts 192 and 193 will be effective for this purpose, depending upon the condition of the cam-operated switch 49. This manual advance switch is normally self centering and both contacts normally-open and is effective for manual advance only if the enabling button 74 is depressed to open switch 143, or if the proper operating temperature has been reached to open switch 57 and thereby the relay switch 151.

After an understanding of the present invention has been acquired by study of the foregoing description in connection with the drawings, it will be recognized that variations may be made within the scope of the invention. Therefore, while the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. Breath sampling apparatus comprising:
    breath sample obtaining means,
    sample measuring means,
    sample delivery means,
    program director means coupled to said obtaining means, to said measuring means, and to said delivery means, and providing automatically a predetermined sequence of communications between said obtaining means and said measuring means, and between said measuring means and said delivery means.

2. The combination of claim 1 wherein:
    said measuring means includes divider means, and
    said program director means includes venting means for venting one portion of said measuring means while providing communication between said obtaining means and another portion of said measuring means.

3. The combination of claim 1 and further comprising:
    pump means coupled to said program director means for communication thereby with said measuring means at times before said sequence for purging steps and at a time after said sequence for delivery of a sample.

4. The combination of claim 3 wherein:
    said measuring means has partition means therein for the isolation from said pump means of a breath sample collected therein, said partition means being movable by pump pressure applied thereto for displacement of a breath sample from said measuring means.

5. The combination of claim 1 wherein:
    said director means include a rotary valve disc having a plurality of passageway means in a face thereof, said passageway means being arranged in series of circularly spaced groups registrable according to said sequence, with port means sealingly and slidingly engaged by said face, said disc being drivable in rotation about an axis by electric drive means.

6. The combination of claim 5 wherein:
    said disc includes a plurality of cam means thereon associated with a plurality of switches cooperable with said drive means for control of said director means.

7. The breath sample analyzing apparatus of claim 1 and further comprising:
    a partition in said measuring means and providing first and second chambers on opposite sides of said partition,
    motor means coupled to said director means and operable, when energized, to drive said director means, and switch means associated with said partition and operable thereby to control energization of said motor means.

8. The apparatus of claim 7 wherein said program director means includes valve means, said apparatus further comprising:
a sampling ampoule disposed for bubbling therethrough a sample from said delivery means,
a photometer holding said sampling ampoule and a standard ampoule, and having balancing means,
a nullmeter associated with said photometer,
a counter associated with the photometer balancing means to register movement required for balancing,
an alarm,
switch means coupled to said valve means and to said alarm and operable at selected valve events to indicate that the nullmeter is to be set, a sample can be taken, and analysis can be made.

9. In gas analyzing apparatus including gas receiving conduit means, gas quantity measuring means, measured quantity delivery means, and analyzer means, the improvement comprising:
director means coupled to said conduit means, to said measuring means, and to said delivery means, and operable through a plurality of discrete directing conditions in sequence, establishing communication between said receiving and measuring means and then between said measuring and delivery means,
and control means operable by said director means in accordance with said discrete directing conditions for operation of the apparatus appropriate to the prevailing directing condition.

10. The improvement of claim 9 and further comprising:
a source of electrical energy, an electrically-operable fluid pump, and a first switch,
said director means being electrically operable and startable through said sequence by closure of said first switch,
said control means including a second switch coupled to said source and to said pump and operable by said director means in two of said discrete conditions to energize said pump for purge in said measuring and delivery means.

11. The improvement of claim 10 wherein:
said analyzing means include an electrically resetable counter, and
said control means include a third switch coupled to said source and to said counter and operable by said director means once during a sequence to reset the counter.

12. The improvement of claim 9 wherein:
said director means are electrically operable through said sequence,
said measuring means includes container means having movable partition means therein, said container means having first and second switch contacts associated therewith and insulated from each other, and said partition means having a third contact associated therewith and movable thereby into engagement with each of said first and second contacts alternatively depending upon the position of said partition means in said container means,
said contacts being in circuit with a portion of said control means and with said source and with operator means for said director means, for coordinating operation of said director means with position of said movable partition means.

13. The improvement of claim 9 and further comprising:
annunciator means and a source of electrical energy,
said analyzer means including a photometer with illuminating means,
said control means including a normally-open electrically-operable switch coupled to said source and to said annunciator means,
and said control means further including a normally-open director-operated switch coupled to said source and to said electrically-operable switch and closable by said director means in two of said discrete conditions thereof to close said electrically-operable switch and activate said annunciator means for alerting the apparatus operator that certain of said conditions have been reached in the sequence.

14. The improvement of claim 13 and further comprising:
a manually-operable normally-open switch coupled to said source, and to reset means for said electrically-operable switch, and to said illuminating means, said switch being operable, when closed, to activate said illuminating means for enabling analysis of gas, and to reset said electrically-operable switch for deactivating said annunciator means.

References Cited
UNITED STATES PATENTS
2,824,789   2/1958   Borkenstein _____ 23—254

MORRIS O. WOLK, Primary Examiner

R. M. REESE, Assistant Examiner

U.S. Cl. X.R.
23—232, 255; 73—421.5